(12) United States Patent
Nagano et al.

(10) Patent No.: US 6,606,976 B2
(45) Date of Patent: Aug. 19, 2003

(54) FUEL SUPPLY SYSTEM OF INTERNAL COMBUSTION ENGINE

(75) Inventors: Masami Nagano, Hitachinaka (JP); Takanobu Ichihara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/940,695

(22) Filed: Aug. 29, 2001

(65) Prior Publication Data

US 2002/0088433 A1 Jul. 11, 2002

(30) Foreign Application Priority Data

Jan. 10, 2001 (JP) ........................... 2001-002553

(51) Int. Cl.[7] ................. F02D 41/30; F02M 31/135
(52) U.S. Cl. ................. 123/431; 123/478; 123/557; 123/590; 123/545
(58) Field of Search ....................... 123/431, 543, 123/545, 546, 549, 554, 555, 556, 557, 590, 299, 300, 301, 531, 478, 491

(56) References Cited

U.S. PATENT DOCUMENTS

| | | | | |
|---|---|---|---|---|
| 4,825,834 A | * | 5/1989 | Toshimitsu et al. | 123/463 |
| 5,284,117 A | * | 2/1994 | Akase | 123/445 |
| 5,289,808 A | * | 3/1994 | Takahashi et al. | 123/406.55 |
| 5,465,701 A | * | 11/1995 | Hunt | 123/179.15 |
| 5,482,023 A | * | 1/1996 | Hunt et al. | 123/491 |
| 5,598,826 A | | 2/1997 | Hunt et al. | 123/451 |
| 5,809,965 A | * | 9/1998 | Atanasyan | 123/339.15 |
| 5,850,822 A | | 12/1998 | Romann et al. | 123/549 |
| 5,894,832 A | | 4/1999 | Nogi et al. | 123/491 |
| 5,927,255 A | * | 7/1999 | Hubbard | 123/543 |
| 6,039,032 A | | 3/2000 | Morikawa et al. | 123/520 |
| 6,053,153 A | * | 4/2000 | Moser et al. | 123/549 |
| 6,058,915 A | * | 5/2000 | Abidin et al. | 123/546 |
| 2001/0025628 A1 | * | 10/2001 | Amou et al. | 123/491 |
| 2001/0039936 A1 | * | 11/2001 | Ichihara et al. | 123/299 |
| 2002/0092508 A1 | * | 7/2002 | Kanekawa et al. | 123/543 |

OTHER PUBLICATIONS

Search Report.

* cited by examiner

*Primary Examiner*—Henry C. Yuen
*Assistant Examiner*—Hai H. Huynh
(74) *Attorney, Agent, or Firm*—Crowell & Moring LLP

(57) ABSTRACT

A fuel supply system for use in an internal combustion engine, comprising: an intake passage; a downstream fuel injection valve near the port of each cylinder of the engine and downstream of the intake passage; and a controller, wherein the intake passage includes a fuel injection/evaporation device which has an upstream fuel injection valve; a heater for evaporating injected fuel; and an air passage for supplying the injected fuel with air. The controller is adapted to control the amount of fuel injected from the downstream fuel injection valve and the upstream fuel injection valve, thereby controlling the fuel-air ratio of the injected fuel.

16 Claims, 14 Drawing Sheets

FUEL SUPPLY SYSTEM OF INTERNAL COMBUSTION ENGINE

BACKGROUND OF THE INVENTION

The present invention relates to a fuel supply system of internal combustion engines, and more particularly to a fuel supply system having improved exhaust gas characteristics and operation performance of multi-cylinder combustion engines.

This type of known fuel supply systems of combustion engines employ a heater arranged in the intake passage of the engine for heating and evaporating the fuel injected into the intake passage so as to decrease deposition of the injected fuel on the inner surface of the intake passage and the intake valve, and hence the amount of hydrocarbons exhausted into the exhaust gas, and in addition improve the combustion in a cold engine during a startup. As an example, U.S. Pat. No. 5,894,832 discloses an internal combustion engine provided with a multi-point injection (MPI) system, in which fuel is injected from injection valves (referred to as port fuel injection valves) one for each intake port of each cylinder, and with an auxiliary air passage, upstream of intake passage, for bypassing a throttle valve. In this arrangement, the engine has a further fuel injection valve (referred to as upstream injection valve) provided near the suction ports and a heater in addition to the auxiliary air passage. The prior art engine is directed to prevent the fuel from deposition on the inner surface of the intake passage by injecting the fuel from the upstream injection valve towards the heater thereby facilitating evaporation of the fuel and hence preventing deposition of fuel on the inner surface of the intake passage during a warm run subsequent to a cold startup period.

The above technique may advantageously improve the combustion of fuel after a startup idling because of heater-assisted evaporation of the fuel in the intake passage. Hence, the technique may make the delay angle of ignition larger as compared with other types of conventional internal combustion engines not equipped with a heater in the intake passage, and may reduce carbon hydrates (HC) in the exhaust gas under warm operational condition (after a cold startup period).

This type of prior art engines have an additional fuel injection valve and a heater in the intake passage upstream of the fuel injection valve in proximity to the individual ports (in the intake passage or on the engine head) of the internal combustion engine, as mentioned above. It is noted, however, that on account of design limitations on the configuration of the suction pipe (intake passage) and/or the layout of the engine room, it is often the case that the additional fuel injection valve and the heater cannot be positioned adequately to distribute fuel evenly to each of the cylinders.

Consequently, it is often the case that the fuel-air ratios cannot be the same or maintained within an expected range for the cylinders (i.e. the fuel-air ratios differ for the individual cylinders).

In addition, uneven fuel-air ratios among the cylinders can spoil the operation performance of the engine.

SUMMARY OF THE INVENTION

In view of the above technical background, the present invention is proposed, of which objects are to provide a fuel injection system of internal combustion engines which can reduce fuel deposition on an intake passage wall of the engine, and to distribute fuel evenly to each of the cylinders of the engine, whereby improving its exhaust gas characteristics and operation performance.

Under the objects there is provided a fuel supply system of an internal combustion engine, comprising:
  an intake passage;
  a downstream fuel injection valve locating at a downstream position of the intake passage near the intake port of each cylinder of the engine; and
  a controller, wherein
    the intake passage is equipped with a fuel injection and evaporation device which has
      an upstream fuel injection valve;
      a heater for evaporating injected fuel; and
      an air passage for supplying air to the injected fuel, and wherein
    the controller is adapted to control amounts of fuel injected from the downstream fuel injection valve and the upstream fuel injection valve, thereby controlling the fuel-air ratio of the injected fuel.

Because of this arrangement, the inventive fuel injection and evaporation device provided in the intake passage advantageously reduces uneven distribution of fuel to the individual cylinders due to design limitations on the mounting location of the evaporator and on the configuration of the intake passage, thereby maintaining the fuel-air rations for the individual cylinders within a specified range.

More specifically, a fuel supply system of the invention comprises a controller having means for calculating the ratio of fuel amounts to be allotted between the upstream fuel injection valve and the downstream fuel injection valve (the ratio hereinafter referred to as fuel allotment ratio, and the means referred to as fuel allotment calculation means). The fuel injection allotment calculation means is adapted to allot less fuel to the downstream fuel injection valve than to the upstream fuel injection valve.

In this arrangement, amounts of fuel can be appropriately allotted between the upstream fuel injection valve and the downstream fuel injection valve, so that unevenness in the fuel-air ratio among the cylinders can be easily reduced. In another embodiment of a fuel supply system of the invention, the controller has means, one for each cylinder, for correcting the amount of fuel injected from the downstream fuel injection valve (said means referred to as fuel amount correction means), and a storage area (fuel amount correction map) for storing constant control parameters calculated by the fuel amount correction means.

The controller may utilize the constant control parameters stored in the storage area as described above to correct uneven fuel-air ratios among the cylinders. The correction can be done by calculating, in a predetermined task, corrective fuel amounts necessary to minimize the uneven fuel-air ratios based on the constant control parameters by means of the fuel amount correction means.

In a further embodiment of the invention, the controller has corrective fuel amount calculation means, one for each cylinder, for calculating a corrective fuel amount for each cylinder based on the actual fuel-air ratio and a target fuel-air ratio for the cylinder. The calculated corrective fuel amounts are stored in the storage area.

It is noted that such corrective fuel amount calculation means and the fuel amount correction map together may provide the controller with the same ability as the preceding controller adapted to calculate the corrective fuel amounts based on the constant control parameters stored in the storage area.

DESCRIPTION OF THE EMBODIMENTS

The invention will be now described in detail by way of example with reference to the accompanying. drawings.

Figure 1:
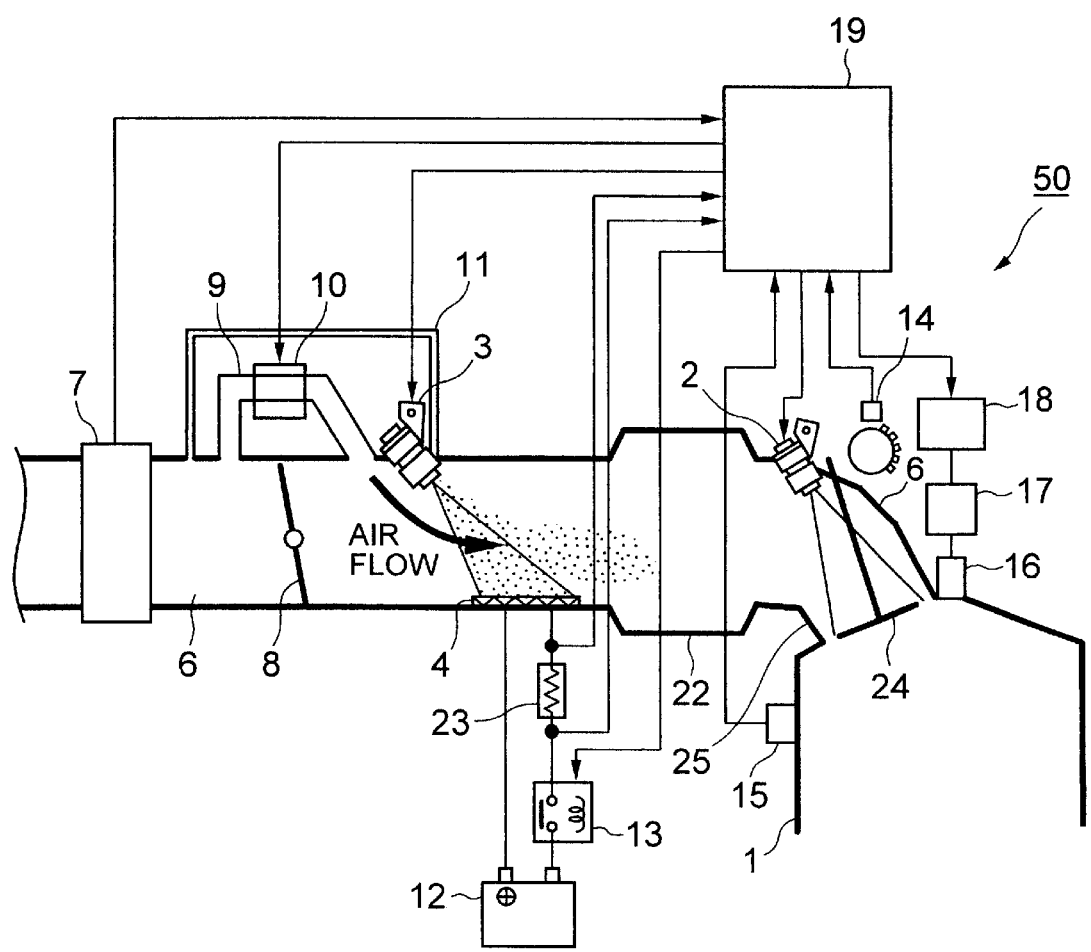
FIG. 1 is a schematic diagram of an embodiment of a fuel supply system according to the invention.

Referring to FIG. 1, there is shown an embodiment of a fuel supply system in accordance with the invention for an internal combustion engine. A multi-cylinder internal combustion engine 50 has a multiplicity of cylinders 1 each connected to an intake passage 6 via a collector 22. Provided in the intake passage 6 are an intake air flow sensor 7 and a throttle valve 8. Mounted at the entrance of an intake port 25 of each cylinder 1 are a port fuel injection valve 2 (hereinafter referred to as downstream fuel injection valve) and an intake valve 24. These elements together constitute an MPI serving as an intake section of the multi-cylinder internal combustion engine 50. In order to facilitate atomization of fuel, there is provided an air-assisted type ultra-atomizing injection valve 3 (hereinafter referred to as upstream fuel injection valve) and air passage 11 for intaking air from an upstream section of the intake passage 6 and supplies the air to the upstream fuel injection valve 3, by-passing the throttle valve 8.

Inside the intake passage 6, and downstream of the upstream fuel injection valve 3, is a heater 4 such as a PTC heater, maintained at a constant temperature. The heater 4 is supplied with a heater current by a battery 12 via a heater relay 13. The heater current is detected by measuring the voltage across the heater 4 by a current detection resistor 23.

An auxiliary intake passage 9 having an idle speed control (ISC) valve 10 is provided to by-pass the throttle valve 8. The idle spin control valve 10 regulates the flow of air (auxiliary air) passing through it. The auxiliary intake passage 9 is configured to direct the auxiliary air to the heater 4.

An ignition plug 16 is mounted on the head section of the cylinder 1, and is connected with an ignition coil 17 and a power switch 18. The internal combustion engine 50 is provided with a crank angle sensor 14 for detecting the rotational speed of the engine, and a cooling water temperature sensor 15. The outputs of the sensors 14 and 15 are fed to a control unit (controller) 19, which controls the downstream fuel injection valve 2, the upstream fuel injection valve 3, the heater 4, the heater relay 13, the ISC valve 10, and the power switch 18.

Figure 2:
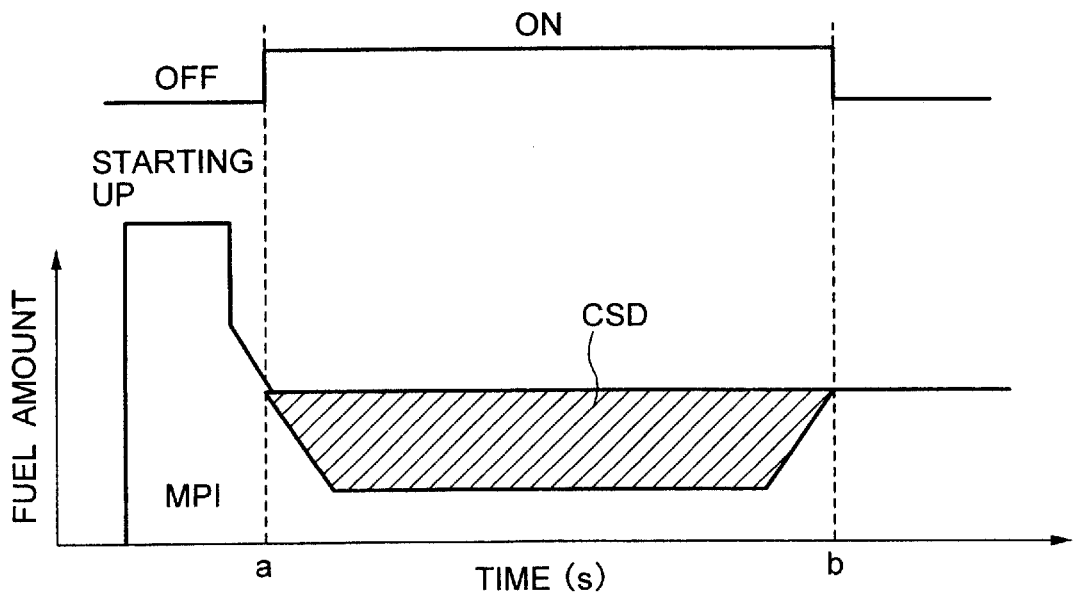
FIG. 2 shows a valve opening signal given to a CSD of a fuel supply system shown in FIG. 1, and timing of fuel injection.

Referring to FIG. 2, a method of controlling the heater 4 will be now described.

The heater 4 is heated when the internal combustion engine 50 undergoes self-sustaining rotation (complete combustion at point "a") subsequent to cranking by a starter (not shown), and remain heated for a predetermined period ("a" to "b"). While the starter is in operation, fuel injection is effected only by the downstream fuel injection valve 2. In this way, timed operations of the starter and the heater 4 during a start up do not overlap, thereby avoiding cripple starter operation that might be otherwise caused by the overlapping. Hence, deterioration of the battery and the power cable due to an excessive current through it will be prevented even if the battery and the power cables have little marginal capacities, and hence the loss of reliability of the starter system can be avoided.

Figure 3:
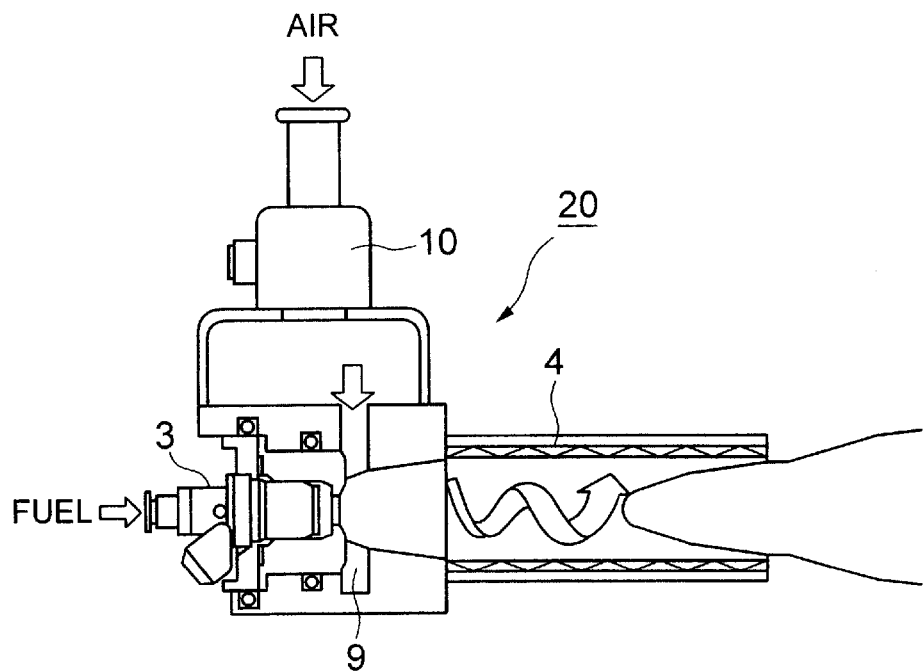
FIG. 3 shows details of a CSD provided in a fuel supply system of FIG. 1.

Referring now to FIG. 3, a fuel injection and evaporation device (hereinafter referred to as CSD (Cold Start Device)) embodying the invention will be now described. The CSD comprises an ISC valve 10, an upstream fuel injection valve 3, a heater 4, and an intake passage 9 for supplying the air to the injected fuel so as to atomize and revolve the injected fuel and direct it to the heater 4. As a result, the fuel abuts on the heater 4 and gets evaporated before it is fed to the cylinder 1.

It has been known that injected atomized fuel having particle sizes of the order of 10 microns will be passed directly to the cylinder 1 without sticking to the intake passage 6. Thus, in the invention, the fuel is atomized to particles of the order of 10 microns while it is injected from the upstream fuel injection valve 3. The fuel thus atomized while passing through the upstream fuel injection valve 3 actually contains particles of different particle sizes. In fact some particles have fairly large sizes. Of the particles, those having smaller sizes can be transported by the air down to the cylinder 1. On the other hand, those having large particle sizes will come to contact with the heater, and get evaporated before they are lead into the cylinder 1.

Figure 4:
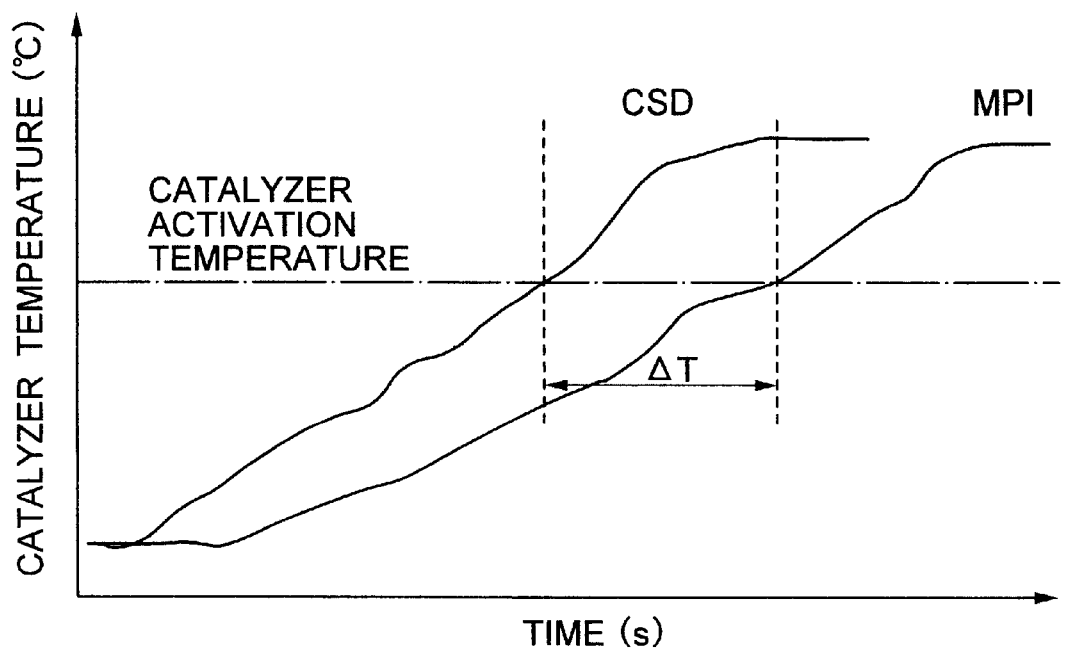
FIG. 4 is a graph showing measured temperature of exhaust gas when a fuel supply system has a conventional MPI system and/or a CSD.

FIG. 4 shows measured temperature of a catalyzer immediately after a startup of an internal combustion engine equipped with only a conventional MPI system, and an internal combustion engine equipped with the inventive CSD. As seen in FIG. 4, the internal combustion engine equipped with the CSD system of the invention has faster temperature rise than the conventional engine by ΔT seconds. It would be understood from this result that the catalyzer is more effective in the CSD than in the conventional MPI system in reducing HC content in the exhaust gas.

Figure 5:
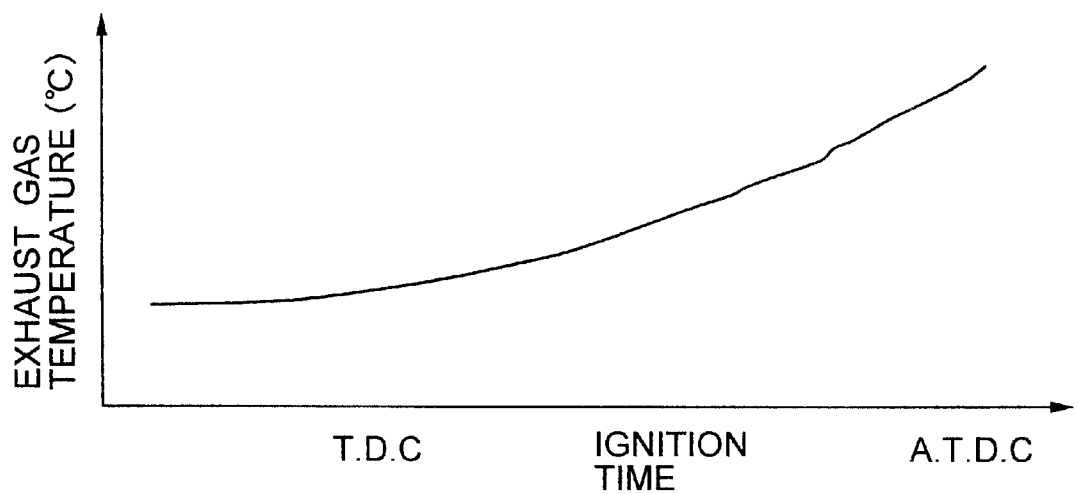
FIG. 5 is a graph showing the temperature of exhaust gas as a function of ignition timing.

This is due to the fact that the exhaust gas burns as it is expelled towards the catalyzer, thereby inducing afterburning in the exhaust gas, when ignition is retarded or delayed for some angle as shown in FIG. 5. Retardation of ignition time cannot be made large unless the air-fuel mixture has a favorable property. The CSD system can supply the engine with well evaporated fuel, so that a large retardation of ignition time is permitted.

Figure 6:
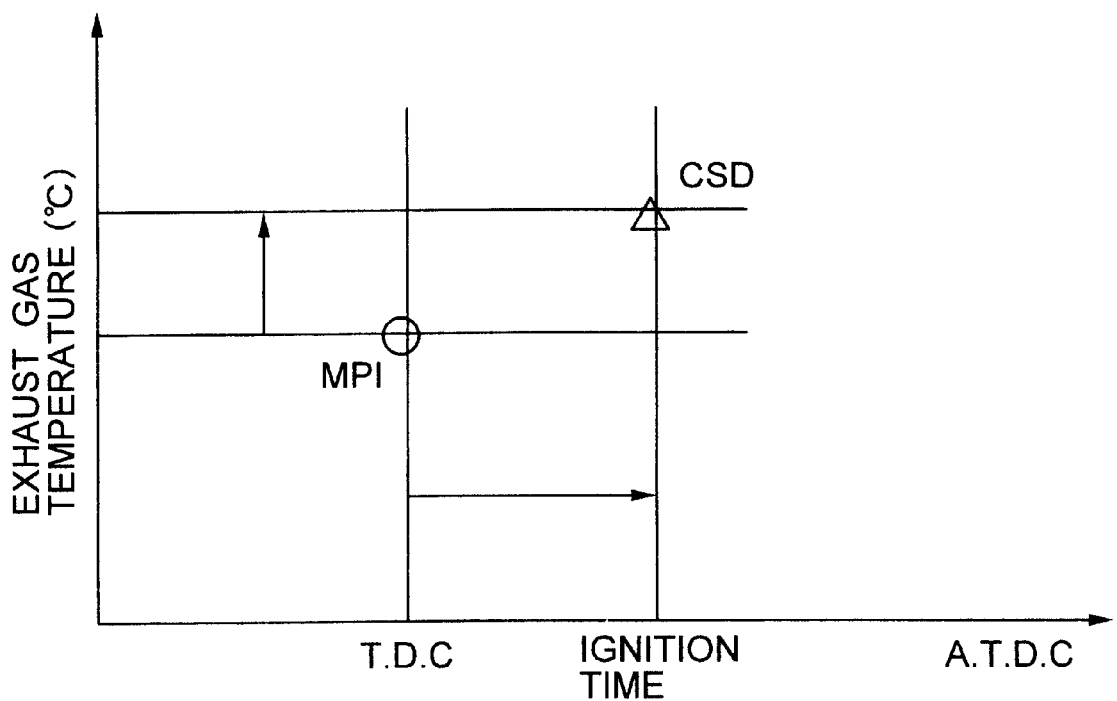
FIG. 6 show retardation limits of a CSD and a conventional MPI system in relation to exhaust gas temperature.

FIG. 6 compares the retardation limits of ignition time and the exhaust gas temperatures for a conventional MPI and an inventive CSD system. Ignition time can be retarded further in the CSD system than in the conventional MPI by 10–15 degrees, so that the temperature of the exhaust gas can be raised by 150–200° C.

Figure 7:
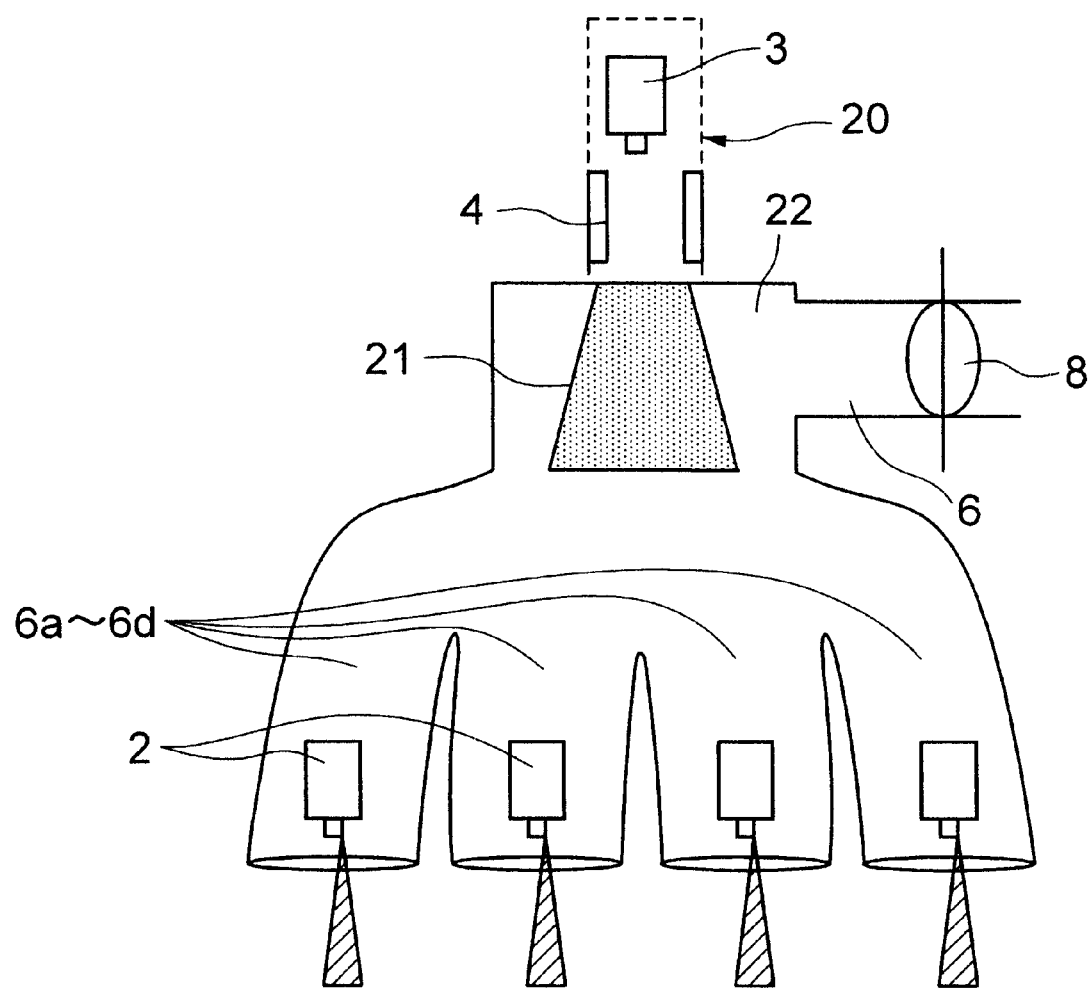
FIG. 7 is a schematic view of an intake passage of a fuel supply system shown in FIG. 1.

Mounting of a CSD system of the invention and accompanying problems will be now described below. FIG. 7 schematically shows arrangement of an intake system having a CSD unit 20. The CSD unit 20, comprising an upstream fuel injection valve 3 and a heater 4, is mounted on a collector (which is a collection of tubes) 22, as shown in FIG. 7. Mounted at the downstream end of each intake passage 6 is the downstream fuel injection valve 2 for the corresponding cylinder, as shown in FIG. 7. Adjacent to the collector 22 is a throttle body which has a throttle valve 8 for controlling the amount of intake air to the internal combustion engine 50. Atomized fuel is sprayed from the CSD 20, in the form of a mist 21 as shown in FIG. 7.

Figure 8:
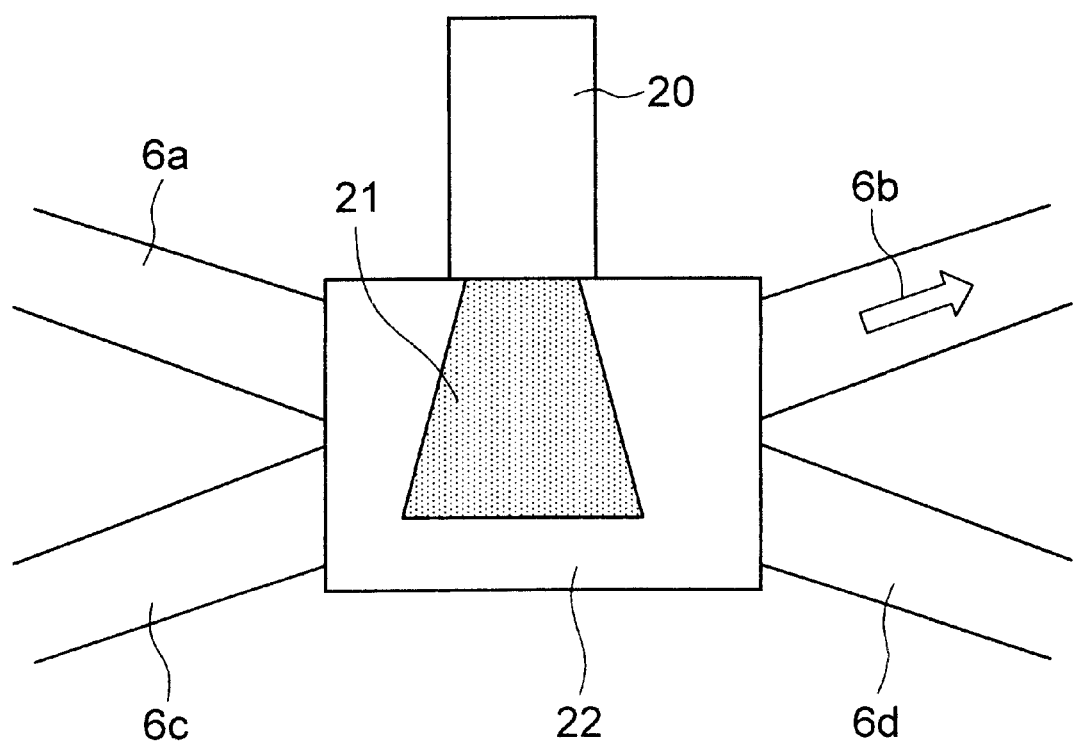
FIG. 8 is another schematic view of the intake passage of FIG. 7, as viewed from another direction.

FIG. 8 shows a top view of the intake system of FIG. 7. It is noted that intake passages 6a, 6b, 6c, and 6d extend from the collector 22 to the respective cylinders 1. The CSD system 20 can be conveniently mounted on either one of the intake passages 6, collector 22, and the engine room, depending on the configuration and/or the layout of these components. If the intake passages 6 have proper configurations, fuel injected from the CSD system 20 will be supplied evenly to each of the cylinders of the internal combustion engine 50. However, if the intake passages have improper configurations, the fuel will stick to the insides of the intake passages 6, and run down on the wall of the intake passages without being distributed evenly to the cylinders.

Figure 9:
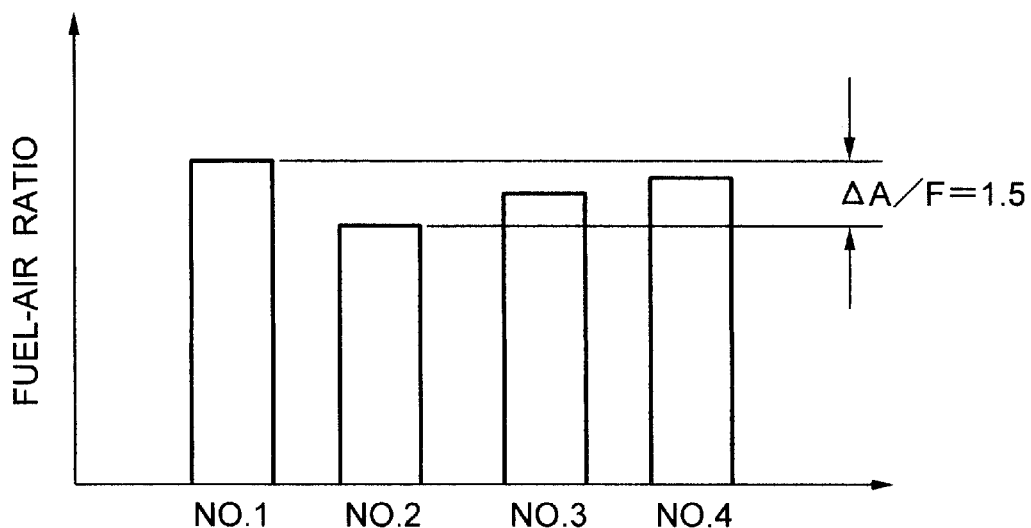
FIG. 9 shows results of measurement of the fuel-air ratios for the respective cylinders of a multi-cylinder engine.
Figure 10:
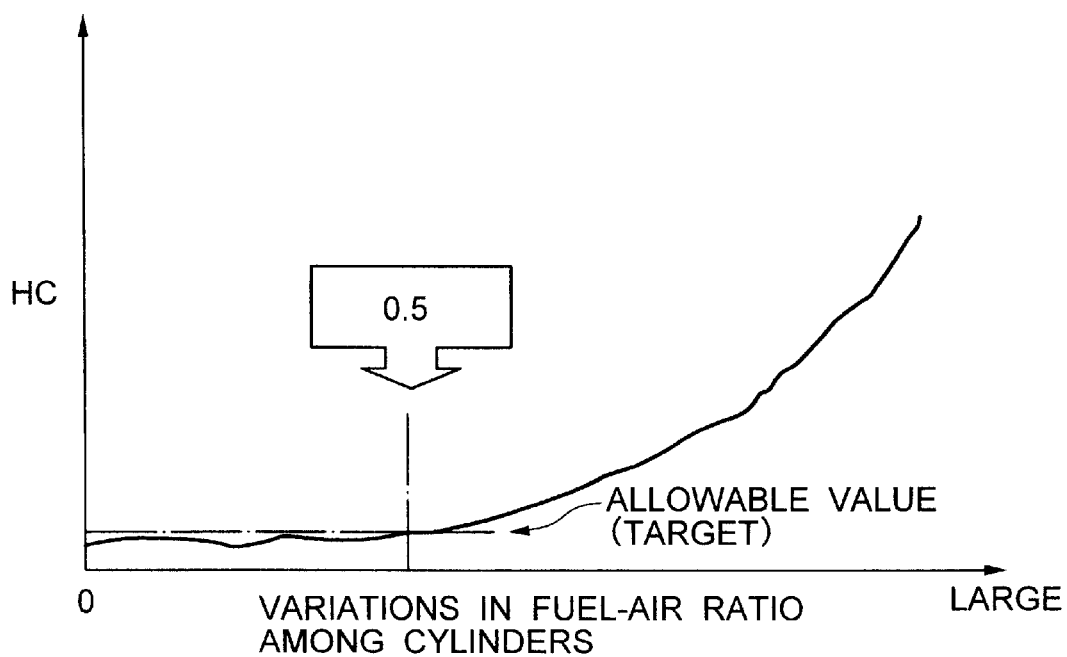
FIG. 10 shows a relationship between the variations of fuel-air ratio among multiple cylinders of an internal combustion engine and the amount of HCs exhausted from the engine.

FIG. 9 shows measured fuel-air ratios of the cylinders of an engine equipped with a CSD systems 20 and mounted on a testing car. In the example shown herein the difference in the fuel-air ratio, ΔA/F, between the most dense air-fuel mixture and the thinnest air-fuel fuel mixture is 1.5. A desirable limit of variations in the fuel-air ratio, ΔA/F, is 0.5, as shown in FIG. 10. Therefore, the variations, ΔA/F, of the fuel-air ratio of the above internal combustion engine should be reduced to 0.5. Thus, in an attempt to absorb the variations in the fuel-air ratio (A/F) among the cylinders, ordinary fuel injection from the downstream injection valve 2 is performed while the CSD 20 is in operation.

Figure 11:
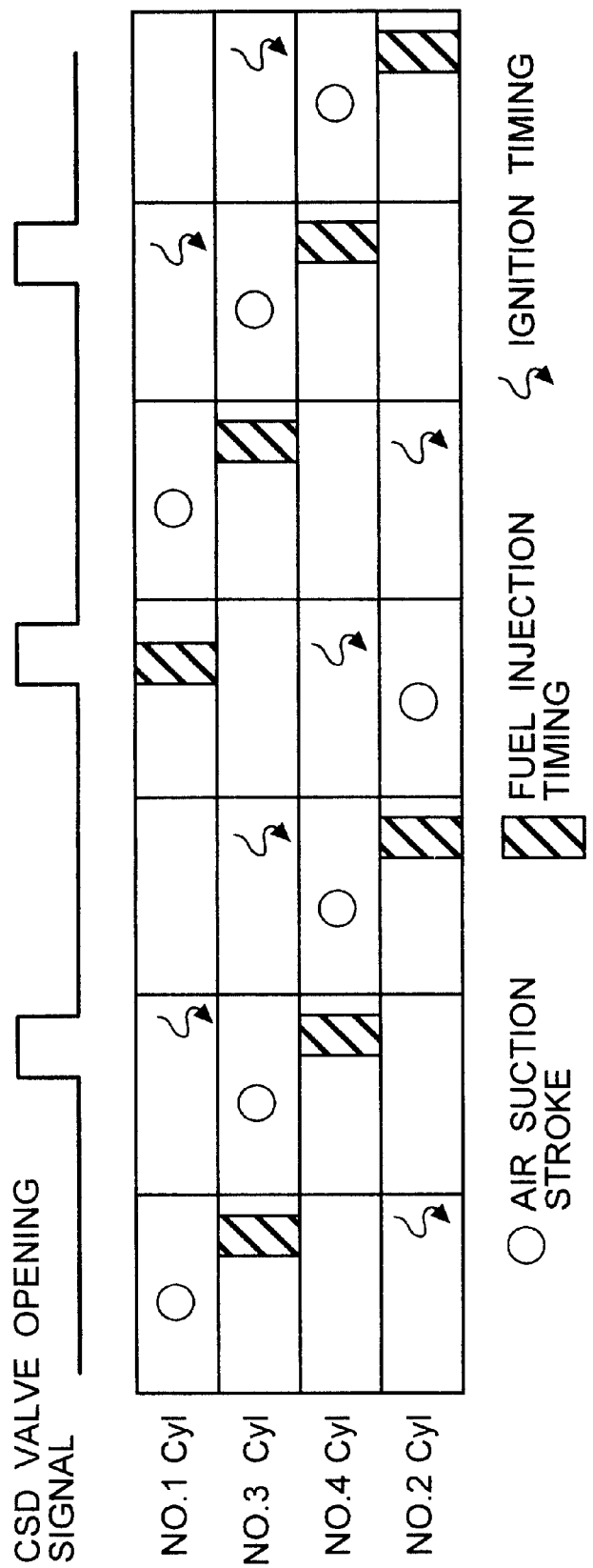
FIG. 11 shows a valve opening signal for the CSD and timing of fuel injection and ignition for four cylinders.

FIG. 11 illustrates timing of the fuel injections to the respective cylinders in reference to the valve opening signal given in the CSD 20. In the example shown herein, the internal combustion engine 50 is assumed to have four cylinders. From the upstream fuel injection valve 3 built in the CSD 20, fuel is injected once for every rotation.

However, it could be understood that the frequency of fuel injection may be once for every two rotations of the engine if the CSD 20 is so designed, considering limitations on the mounting location of the CSD 20 and/or the configurations of the intake passages 6. Conversely, the injection frequency may be increased to 2 cycles per revolution to reduce fuel deposition on the inner surface of the intake passage 6 in case the CSD 20 cannot be mounted at an optimum position.

The downstream injection valves 2 mounted at the lower ends of the intake passages 6 undergo so-called sequential injections, or ordinary timed injections. Incidentally, fuel injection may be either simultaneous injection or grouped injection for grouped cylinders, so long as the fuel supply system is provided with means for adjusting the amount of fuel to each of the cylinders. Once the hardware design of the fuel supply system is determined, i.e. the location of the CSD 20 and the configurations of the intake passages 6 are determined, the fuel-air ratio (A/F) for each cylinder may be determined, as shown in FIG. 9.

Figure 12:
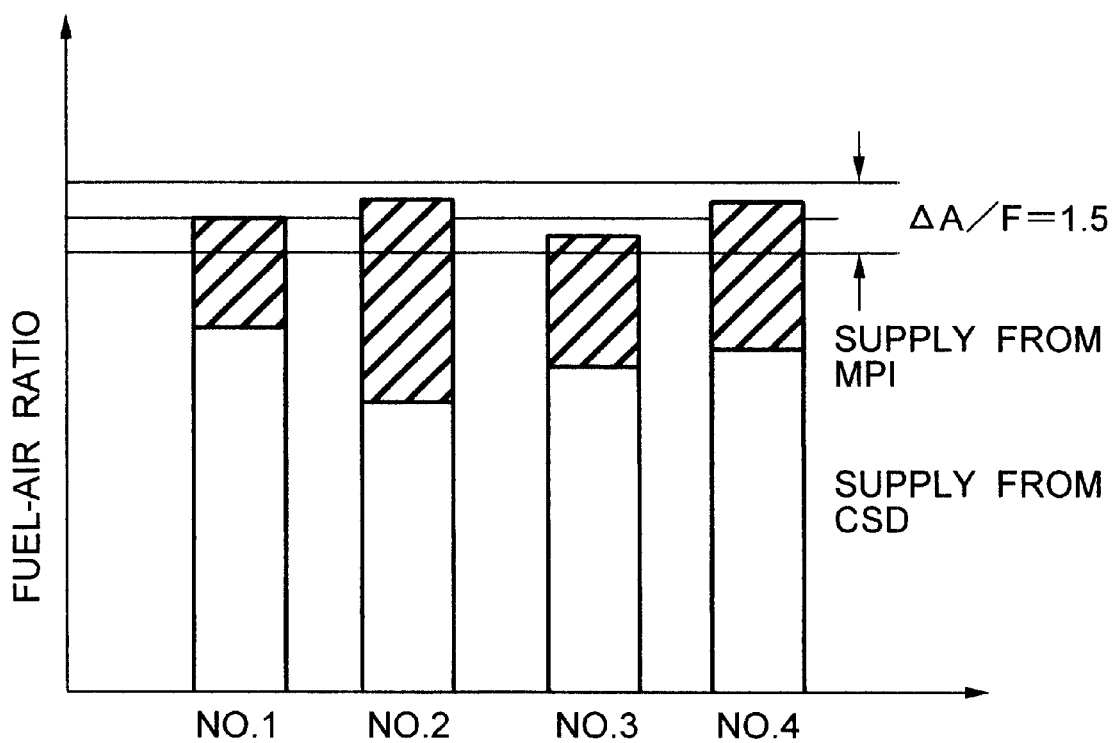
FIG. 12 illustrates measured fuel-air ratios in four cylinders.

Now, it is possible to correct or compensate the shaded portion the fuel-air ratio shown in FIG. 12 for each cylinder by means of the downstream injection valve 2 to suppress ΔA/F within 0.5.

Figure 13:
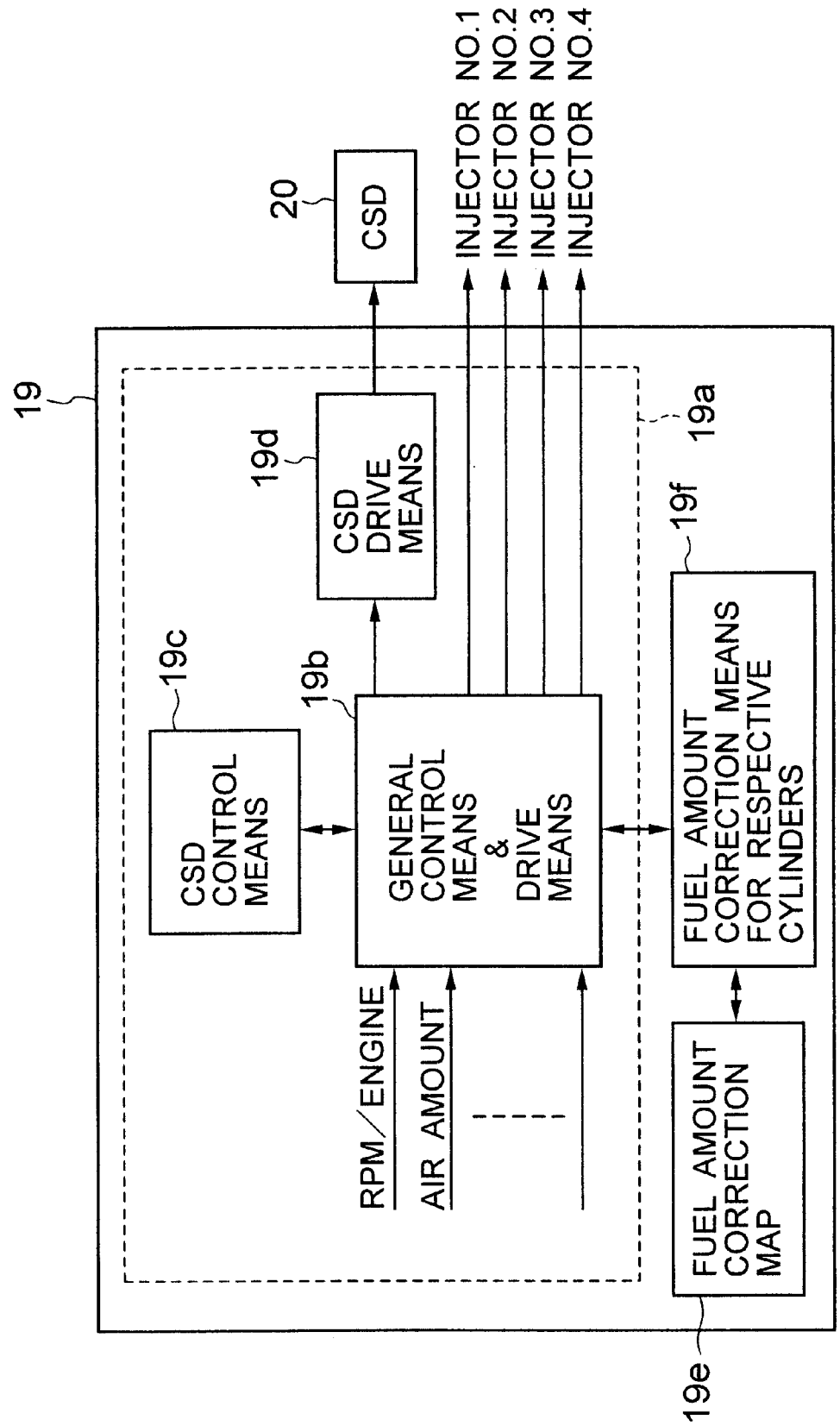
FIG. 13 is a black diagram of a fuel supply system shown in FIG. 1.

FIG. 13 is a block diagram showing a control system governing the entire fuel supply system of the invention. The control unit 19 includes a conventional control system 19a, shown with broken outline, and an additional inventive control elements depicted outside the broken outline.

A general control means 19b calculates the amounts of fuel to be injected from downstream fuel injection valves 2 to the respective cylinders based on various detection signals indicative of, for example, engine speed and the amount of air taken in. The CSD control means 19c calculates the amounts of air and the fuel to be injected by the CSD 20 and feeds the calculated data (correction data) to a CSD drive means 19d. The CSD drive means 19d calculates the magnitude of a change that must be made for the CSD 20 and drives the CSD for that amount.

The calculated values to absorb the variations in the fuel-air ratio for the respective cylinders are stored in advance in the fuel amount correction map 19e. The amounts of fuel for the respective cylinder are corrected by fuel amount correction means 19f during its task. Signals instructing the correction are fed by the fuel amount correction means 19f to the general control means (and driving means) 19b, thereby correcting the amounts of fuel injected into the respective cylinders.

Thus, it would be apparent to a person of skill in the art that, once the configurations of the CSD 20 and the intake passages 6 are determined, air flow patters in the CSD 20 and intake passages 6 are determined, from which the fuel-air ratios are determined for the respective cylinders, and therefore that the variations in the fuel-air ratio for the multiple cylinders may be minimized by properly correcting the fuel-air ratios based on predetermined fuel amount correction parameters for the respective cylinders.

Figure 14:
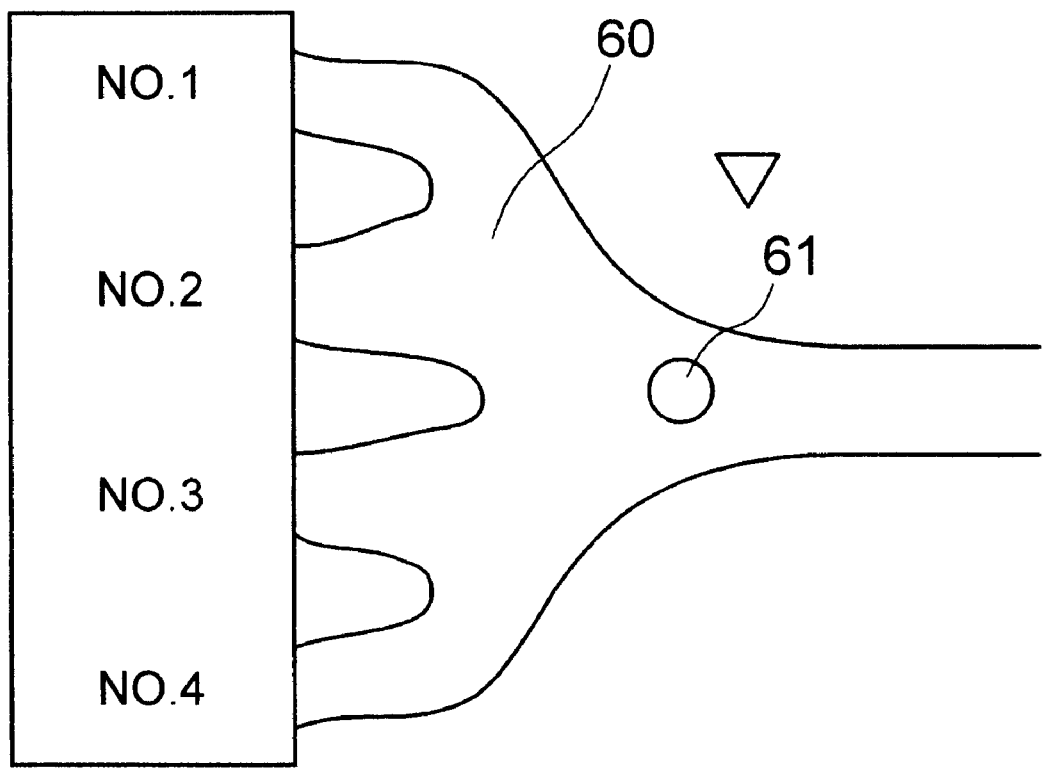
FIG. 14 shows (an arrangement of) an exhaust system having an exhaust gas sensor.
Figure 15:
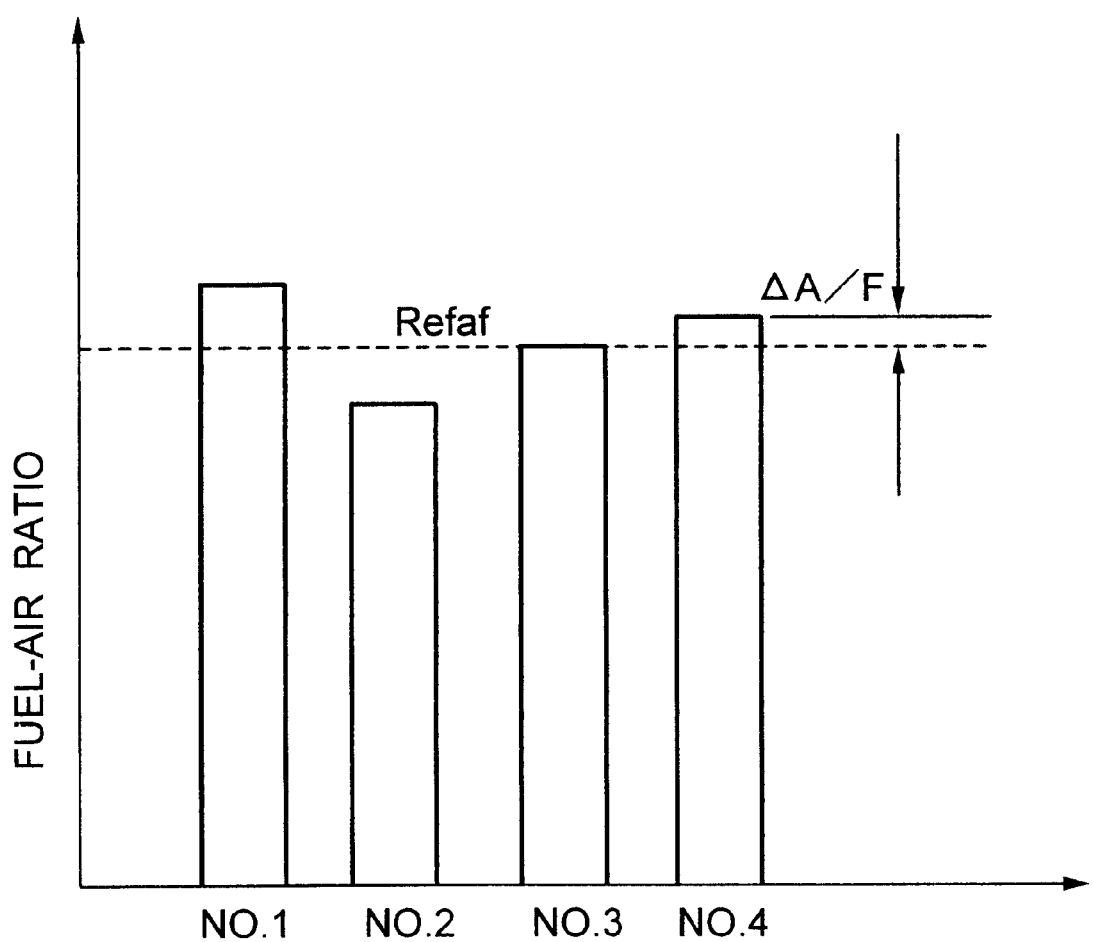
FIG. 15 shows variations in the fuel-air ratio for the respective cylinders.

FIG. 14 shows an example of exhaust system for use in the internal combustion engine 50. Fuel-air ratios for the respective cylinders may be detected by means of an exhaust gas sensor 61 provided in the exhaust pipe 60, by allowing only the CSD 20 to operate. FIG. 15 shows a result of such measurement of the fuel-gas ratios by the exhaust gas sensor 61. From such measurements for the cylinders, differences between the detected fuel-air ratios and the corresponding target fuel-air ratio, or equivalently the ratio between them, may be obtained, from which required air-fuel corrections may be calculated and stored in a predetermined storage area. Thus, air-fuel corrections similar to the preceding example may be attained.

Figure 16:
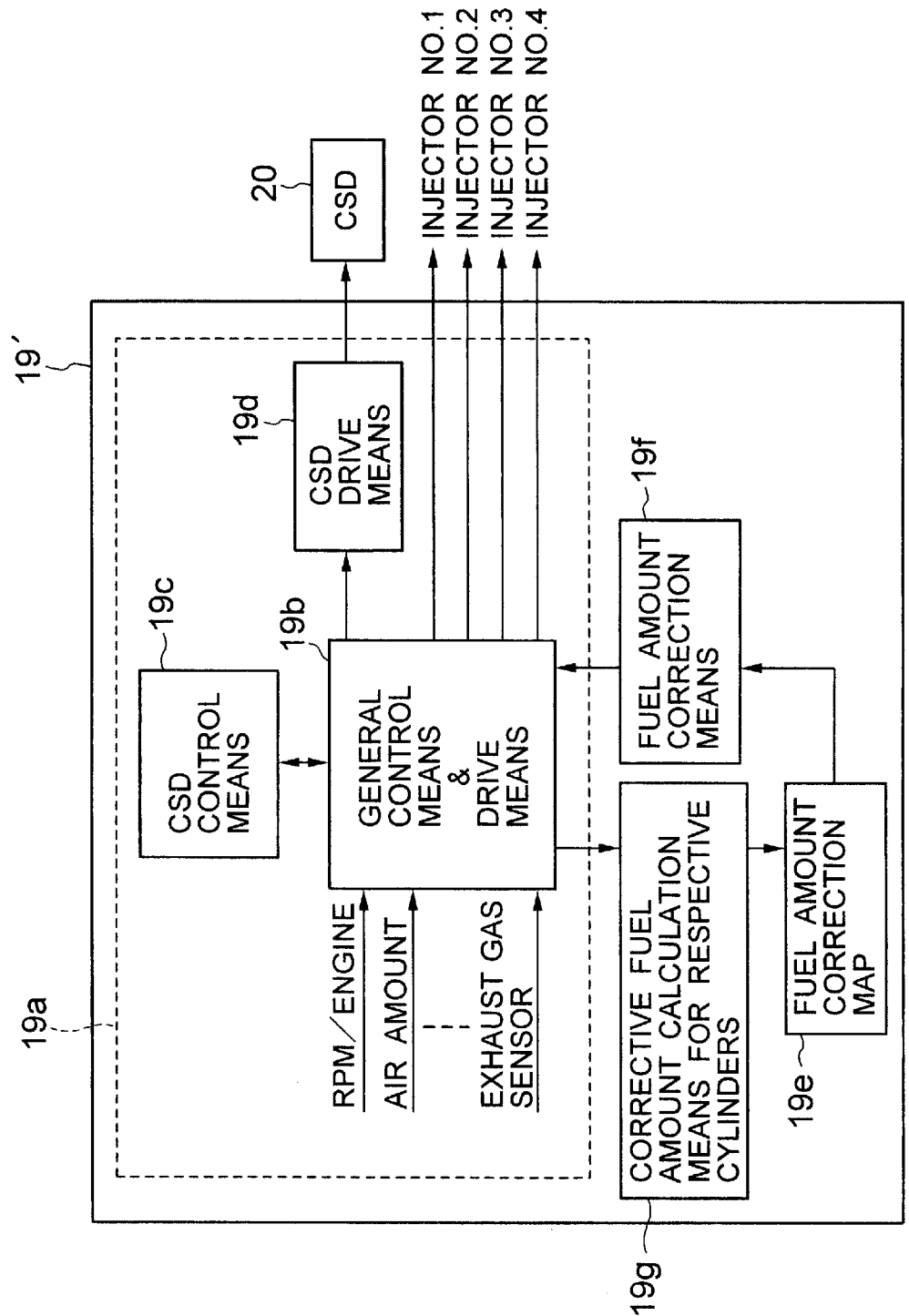
FIG. 16 is a block diagram of another embodiment of a fuel supply system shown in FIG. 1.

FIG. 16 is a block diagram of an entire embodiment of another fuel supply system according to the invention. In comparison to the foregoing embodiment, this embodiment further includes means 19g for calculating the amounts of fuel to be corrected for the respective cylinders. Fuel amount calculation means 19g calculates the difference Refaf, or an alternative ratio, between the detected air-fuel ratio and the target ratio for each of the cylinders. The result of the calculation is stored in the fuel amount correction map 19e.

Figure 17:
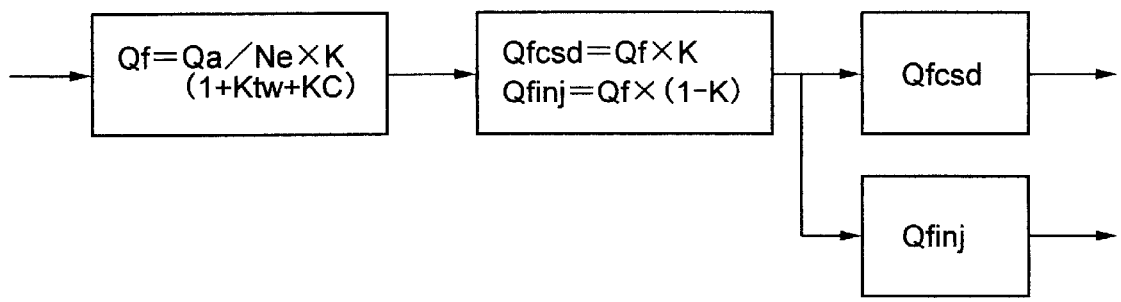
FIG. 17 shows a block diagram of fuel allotment means of a CSD and an MPI system of the fuel supply system shown in FIG. 1.

FIG. 17 shows the operation for allotting fuel between the CSD 20 and the downstream fuel injection valve 2 of each cylinder. The amounts of fuel Qf to be supplied to each cylinder is determined by the amount of intake air Qa, engine speed Ne, and various correction coefficients. An allotment factor K represents a ratio of allotted fuel amounts between the CSD 20 and the downstream fuel injection valve 2 and is determined based on the fuel-air ratio test performed for each of the cylinders as described above. The factor K depends on the deviation of the fuel-air ratio from the target value. That is, the factor K for a given cylinder is determined by the ratio of the shaded area to the white area of the bar for the cylinder shown in FIG. 12.

Figure 18:
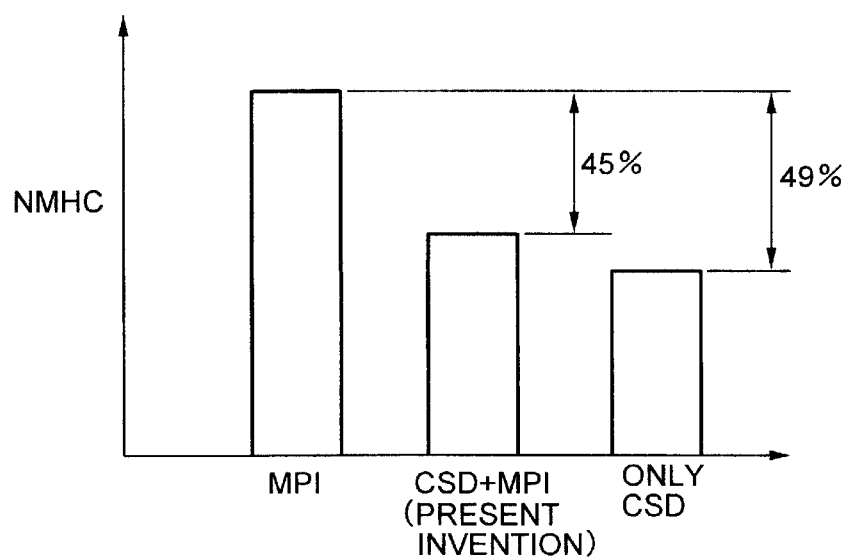
FIG. 18 shows the result of an emission test for an inventive fuel supply system (CSD and MPI system), a fuel supply system having only a CSD, and a fuel supply system having only an MPI system.

FIG. 18 shows the result of emission tests performed in the exhaust gas measurement of mode LA4 in accord with U.S. Government regulations. Assuming that the CSD system is installed at an optimum position of an engine, the CSD system can reduce NMHC value as much as 49% as compared with conventional MPI systems by optimizing the configurations of the intake passages and modifying the engine layout appropriately. It has been confirmed in the experiments performed by the inventors that, the CSD system coupled with an MPI system as in the present embodiment can reduce NMHC value by about 45% as compared with conventional MPI system without changing the arrangement of the intake passages and the engine layout, if the A/F ratio varies from one cylinder to another. This arrangement is less effective only slightly than the preceding embodiment where CSD is not coupled with an MPI system.

Although the invention has been described with particular reference to certain preferred embodiments thereof, variations and modifications of the present invention can be effected within the scope of the invention.

As described above, a fuel supply system of the invention for an internal combustion engine comprises a downstream injection valve located at each suction port; a fuel injection and evaporation device having an upstream fuel injection valve, located at a position upstream of the downstream fuel injection valve, and a heater; wherein the fuel supply system is adapted to adjust fuel-air ratios to the respective cylinders by controlling the amount of fuel injected from the downstream injection valve and upstream injection valve, whereby the fuel injection and evaporation device mounted in the intake passage is capable of regulating the fuel-air ratios for the respective cylinders, should the fuel injection and evaporation device fail to supply fuel evenly to the cylinders due to design limitations on the mounting position and/or configuration of the fuel injection/evaporation unit.

Thus, according to the invention, it is possible to extend mounting freedom for the fuel injection and evaporation device, and to improve exhaust gas characteristics and operation performance of the engine.

What is claimed is:

1. A fuel supply system for use in an internal combustion engine with a plurality of cylinders, comprising:
   a downstream fuel injection valve at a downstream position of an intake passage near the intake port of each of said cylinders and
   a controller, wherein
     said intake passage is equipped with a fuel injection and evaporation device which has
     an upstream fuel injection valve;
     a heater for evaporating injected fuel; and
     an air passage for supplying said injected fuel with air, and injection amounts of fuel injected from said downstream fuel injection valve and from said upstream fuel injection valve of said fuel injection and evaporation device are controlled by said controller so that the fuel-air ratios or fuel amounts are uniform among said cylinders.

2. A fuel supply system according to claim 1, wherein said controller has a fuel allotment calculation means for calculating a fuel allotment ratio for allotting fuel between said upstream fuel injection valve and said downstream fuel injection valve.

3. A fuel supply system according to claim 2, wherein said fuel allotment calculation means allots less amount to said downstream fuel injection valve than to said upstream fuel injection valve.

4. A fuel supply system according to claim 3, wherein said controller comprises a fuel amount correction means for correcting the fuel amount at each cylinder, said injection fuel amount correction means correcting the injection fuel amount from said downstream fuel injection valve.

5. A fuel supply system according to claim 4, wherein said controller further comprises a storage area for storing constant control parameters for correcting the amount of fuel injected from said downstream fuel injection valve.

6. A fuel supply system according to claim 5, wherein said controller comprises a corrective fuel amount calculation means for correcting the fuel amount at each cylinder, said corrective fuel amount calculation means calculating a corrective fuel amount for each cylinder based on the actual fuel-air ratio and a target fuel-air ratio for the cylinder, wherein said storage area is adapted to store said calculated corrective fuel amount.

7. A fuel supply system according to claim 2, wherein said controller comprises a fuel amount correction means for correcting the injection fuel amount at each cylinder, said fuel amount correction means correcting the injection fuel amount from said downstream fuel injection valve.

8. A fuel supply system according to claim 7, wherein said controller further comprises a storage area for storing a control constant for correcting the injection fuel amount from said downstream fuel injection valve.

9. A fuel supply system according to claim 8, wherein said controller comprises a corrective fuel amount calculation means for correcting the fuel amount at each cylinder, said corrective fuel amount calculation means calculating a corrective fuel amount for each cylinder based on the actual fuel-air ratio and a target fuel-air ratio for the cylinder, wherein said storage area is adapted to store said calculated corrective fuel amount.

10. A fuel supply system according to claim 1, wherein said controller comprises a fuel amount correction means for correcting the injection fuel amount at each cylinder, said fuel amount correction means correcting the injection fuel amount from said downstream fuel injection valve.

11. A fuel supply system according to claim 10, wherein said controller further comprises a storage area for storing a control constant for correcting the injection fuel amount from said downstream fuel injection valve.

12. A fuel supply system according to claim 11, wherein said controller comprises a corrective fuel amount calculation means for correcting the fuel amount at each cylinder, said corrective fuel amount calculation means calculating a corrective fuel amount for each cylinder based on the actual fuel-air ratio and a target fuel-air ratio for the cylinder, wherein said storage area is adapted to store said calculated corrective fuel amount.

13. A fuel supply system according to claim 1, wherein said controller is previously provided with a correction value of injection fuel amount at each said cylinder.

14. A fuel supply system according to claim 13, wherein said correction value of injection fuel amount, which absorbs variations in the fuel-air ratio of respective said cylinder, is determined by previously storing a control constant for correcting the amount of injection fuel in said controller.

15. A fuel supply system according to claim 1, wherein a correction value of injection fuel amount is determined at each said cylinder by said controller on the basis of a difference between an actual fuel-air ratio and a target fuel-air ratio.

16. A fuel supply system according to claim 15, wherein said correction value of injection fuel amount is determined by said controller on the basis of an actual fuel-air ratio and a target fuel-air ratio per respective said cylinder, and stored in a storage area of said controller.

* * * * *